United States Patent
Rees

[15] 3,651,707
[45] Mar. 28, 1972

[54] PORTABLE POWER TOOL CONSTRUCTION
[72] Inventor: Spencer C. Rees, Aurora, Ill.
[73] Assignee: Thor Power Tool Company, Aurora, Ill.
[22] Filed: July 22, 1970
[21] Appl. No.: 57,275

[52] U.S. Cl. ..............................74/421 A, 308/22, 308/178, 310/50
[51] Int. Cl. .....................F16h 1/20, F16c 35/00, H02k 7/14
[58] Field of Search ..............74/421 A; 308/22, 178; 310/50

[56] References Cited

UNITED STATES PATENTS

| | | | |
|---|---|---|---|
| 3,536,943 | 10/1970 | Bowen et al. | 310/50 |
| 2,290,579 | 7/1942 | Bruno | 308/22 X |
| 2,531,849 | 11/1950 | Karleen | 74/421 A X |
| 2,552,234 | 5/1951 | Thibodeau | 74/421 A |
| 2,772,127 | 11/1956 | Sborlino | 308/178 |
| 3,364,772 | 1/1968 | Easton | 74/421 A |
| 3,434,366 | 3/1969 | Raso et al. | 74/421 A |

*Primary Examiner*—Leonard H. Gerin
*Attorney*—Hibben, Noyes and Bicknell

[57] ABSTRACT

A portable power tool including a motor, a drive train, and a bearing block for the drive train, all mounted in a split outer housing. The motor and drive train have bearings mounted in the bearing block which is made from a material which has high strength and which is a good heat sink. The outer housing is made from an electrical insulating material for double insulation. The outer housing is split and the axes of various shafts are offset.

12 Claims, 9 Drawing Figures

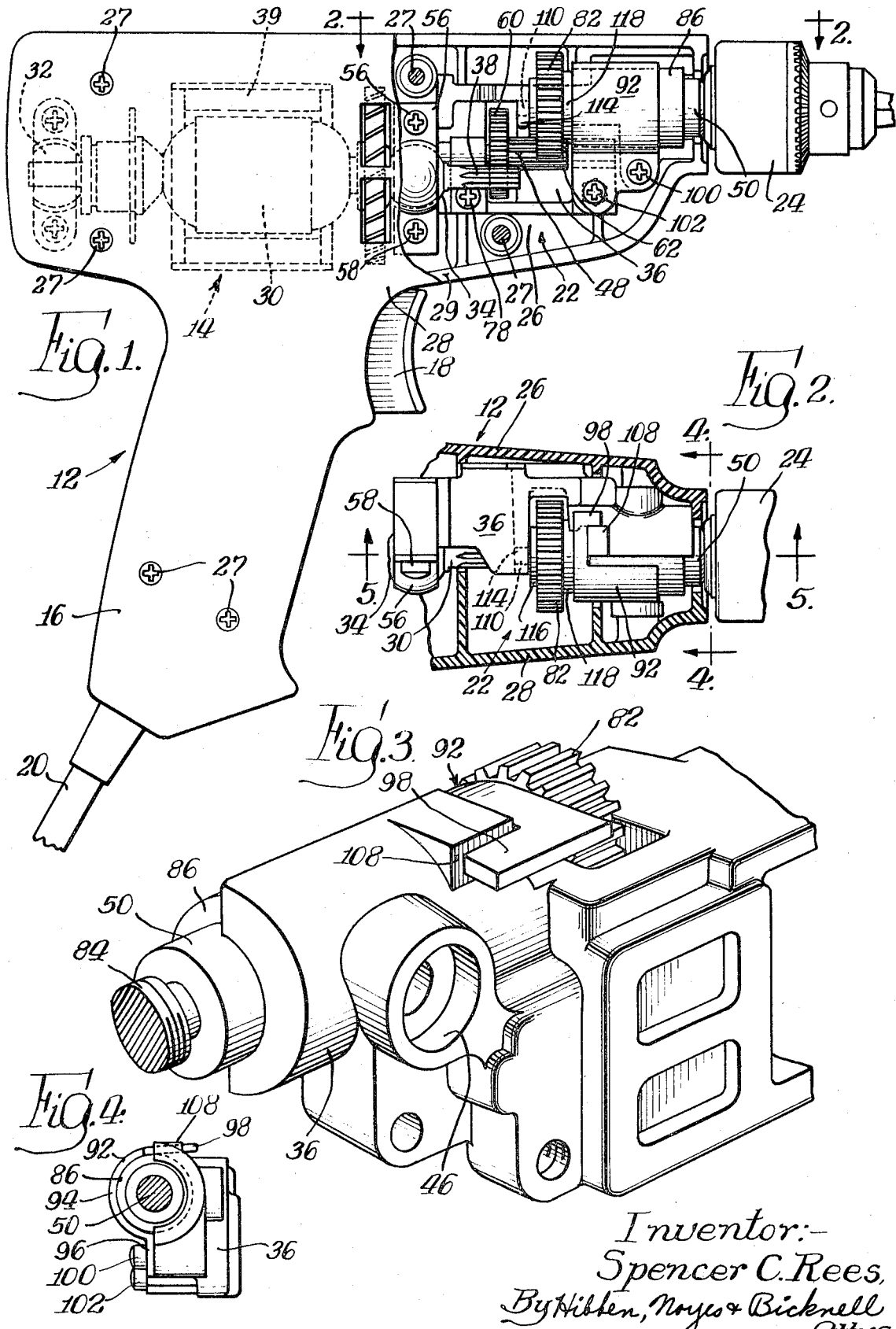

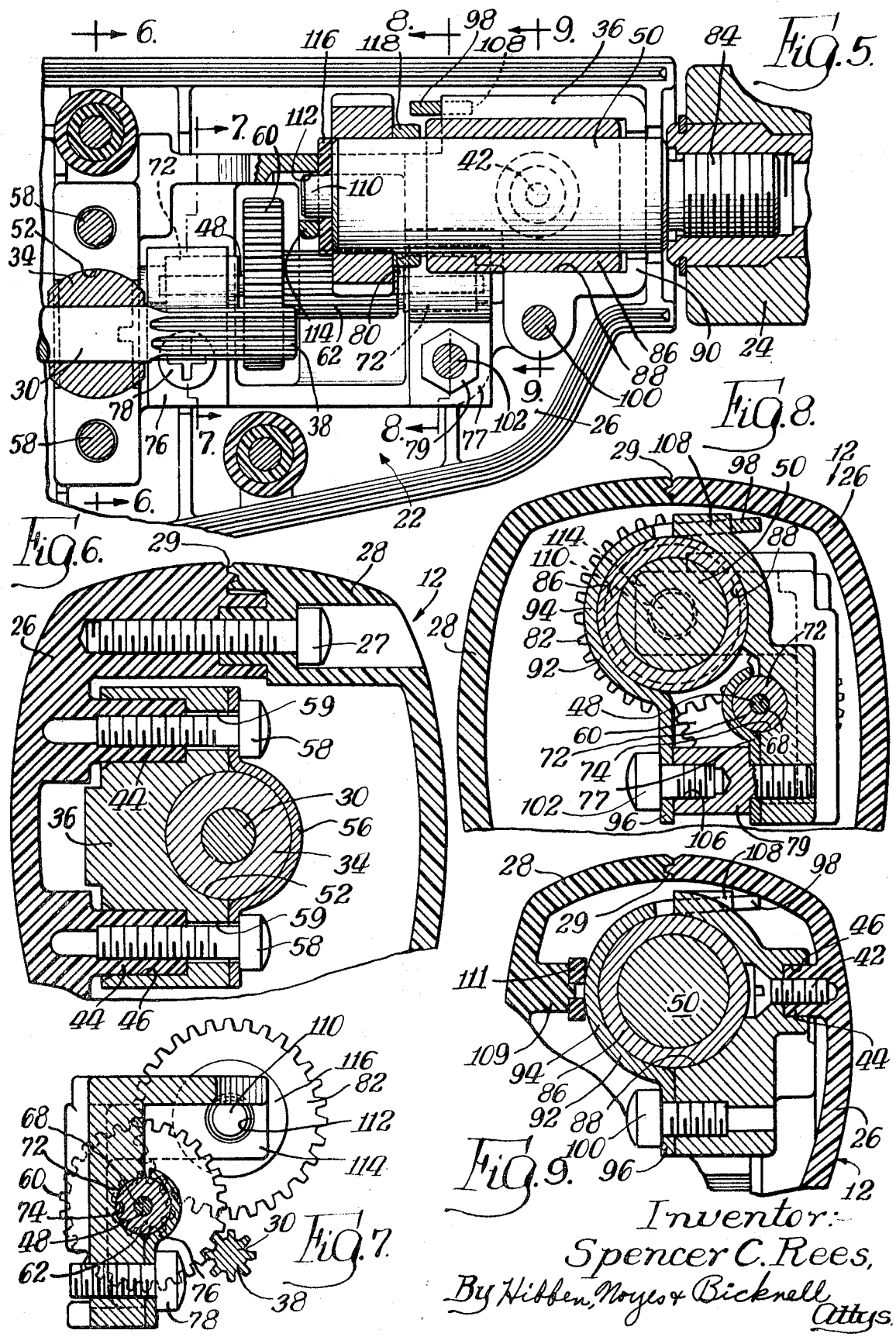

PORTABLE POWER TOOL CONSTRUCTION

Hand held or portable power tools, such as a drill, should have high power output and, in addition, should be lightweight and well balanced so as not to fatigue its operator. Electric power tools presently on the market when built to standards of double insulation so that the ground wire can be omitted tend to be heavy and bulky. Plastic has been used for the housing of a double-insulated tool in order to reduce size and weight. While plastic is an excellent insulator and is lightweight, it has the disadvantage of being subject to physical and thermal failures when used to support the bearings for the drive motor and the power output shafts. Power tools wherein the motor and mechanisms of the tool are contained or enclosed in a housing of clamshell or split construction are less expensive to manufacture and assemble and present a more pleasing appearance than power tools of the "stacked" design, but the clamshell design does not readily permit an offset shaft design which gives increased compactness.

According to the present invention, a lightweight and compact double-insulated power tool having high power output has been provided comprising a split outer housing, a drive motor, a power output member, and a drive train unit connecting the motor to the member. The drive train is in the present instance a gear reduction assembly including shafts, bearings and a bearing block. The bearing block is formed from a strong, high heat-dissipating material, thus enabling the outer housing to be formed from lightweight plastic insulating material. The shafts and bearings are mounted on the bearing block in an offset construction to achieve compactness, and the bearing block inturn is mounted in the outer housing. The split outer housing and the drive train unit are so constructed as to retain the ease of assembly and inexpensiveness of the split housing type of construction, and yet have the compactness of the offset shaft construction.

Further advantages of the present invention will become apparent from the following detailed description taken in conjunction with the accompanying figures of the drawings, in which:

FIG. 1 is a side elevational view, with a portion broken away, of a portable tool featuring the preferred embodiment of the present invention;

FIG. 2 is a fragmentary view taken along the line 2—2 of FIG. 1, with some parts broken away to more clearly show underlying parts;

FIG. 3 is an enlarged perspective view of a portion of a drive train unit of the tool shown in FIG. 1;

FIG. 4 is a fragmentary cross-sectional view taken along the line 4—4 of FIG. 2 with some parts omitted for clarity;

FIG. 5 is an enlarged fragmentary cross-sectional view taken along the line 5—5 of FIG. 2;

FIG. 6 is a fragmentary cross-sectional view taken along the line 6—6 of FIG. 5;

FIG. 7 is a fragmentary cross-sectional view taken along the line 7—7 of FIG. 5;

FIG. 8 is a fragmentary cross-sectional view taken along the line 8—8 of FIG. 5; and FIG. 9 is a fragmentary cross-sectional view taken along the line 9—9 of FIG. 5.

A portable tool, in this instance a hand drill, embodying features of the present invention is illustrated in FIG. 1 and comprises an outer housing 12 which encloses an electric motor 14 and has a handle portion 16 adapted to be gripped by the operator. As is shown, a trigger 18 is mounted on the handle and an electric cord 20 extends from the lower end of the handle. The motor 14 is shown in the copending Spencer C. Rees et al. U.S. Pat. application, Ser. No. 57,176, filed July 22, 1970, and drives a power train unit 22 which is a gear reduction assembly to be described in greater detail. A chuck 24 for receiving drill bits or other tools for use with the drill is secured to the output shaft of the power train unit 22.

The housing 12 comprises two halves, a support half 26 and a cover half 28, the halves being joined at a common longitudinal split 29. The support half 26 carries and supports the motor 14 and the power train unit 22, and the cover half 28 serves primarily as a closure. The cover half 28 is secured to the support half 26 by fasteners 27.

The motor 14 includes an armature shaft 30 supported by a rear bearing 32 mounted on the support half 26 by fasteners, and by a front bearing 34 mounted on a bearing block 36 (FIG. 3) hereinafter described. While ball bearings or roller bearings may be used, in this instance, all the bearings are of the sleeve type. The forward end of the armature shaft 30 has an integral gear 38 formed thereon for driving the power train unit 22. The gears in the drill shown are spur cut, it being understood that other types of gears such as helical gears may also be used. A stator 39 surrounds the armature 30 and is secured in place in a nest or pocket formed in the support and cover halves 26 and 28 as described in the above-mentioned copending application.

The power train unit 22 is in the present instance a gear reduction assembly and comprises shafts, gears, bearings for said shafts, and the bearing block 36. The bearing block 36 supports said bearings and also serves as a heat sink for the heat generated in the bearings.

The bearing block 36 as was heretofore mentioned is supported by the support half 26 of the outer housing 12 and is secured thereto by a plurality of screw fasteners such as fastener 42 (FIG. 9), by bosses 44 (FIGS. 6 and 9) of the support half 26 which extend into sockets or recesses 46 formed in the bearing block 36, and by fasteners 58 hereinafter described. The bearing block 36 is of unitary construction and, except for the rear bearing 32 for the motor 14, carries or supports all bearings of the drill, as will be hereinafter described. A primary advantage of the bearing block 36 is that it enables use of a split outer housing 12 in a double insulated tool and that the housing 12 may be molded from an electrical insulating, lightweight material, such as polycarbonate plastic, because the bearing block 36, which absorbs the mechanical forces during use of the tool and the heat generated thereby, can be made of a material having high strength and good heat sink characteristics, such as die cast aluminum alloy. The result is a lightweight tool with good insulation properties and high strength in areas where needed.

To obtain the advantage of split housing construction, i.e., the low cost of manufacture and ease of assembly, and the advantages of offset shaft in the power or drive train, i.e., a minimum chuck offset, all bearings of the drive train are supported by the bearing block 36.

The bearing block 36 supports the front bearing 34 of the motor 14, bearings for an intermediate shaft 48 driven by the armature, and bearings for an output shaft or spindle 50 which carries the chuck 24.

The outer surface of the bearing 34 is generally spherical, and the bearing block 36 has a semispherical recess 52 (FIG. 6) formed therein which receives the spherical sleeve-type bearing 34. A bearing strap 56 which is held in place by fasteners 58 secures the bearing in the recess. The fasteners 58 extend through holes 59 (FIG. 6) in the block 36 and are threaded into the bosses 44 on the support half 26 to hold the bearing block 36 in place. The spherical configuration of the bearing 34 and also of the rear bearing 32 permits the armature shaft 30 to properly align itself on the support half 26 of the housing 12. The armature shaft 30 has formed on the forward end thereof the gear 38 which drives a gear 60 on the intermediate shaft 48.

The intermediate shaft 48 (FIGS. 7 and 8) is offset toward the support half 26 and is vertically intermediate the armature shaft 30 and spindle shaft 50, the shafts 30 and 50 being in the plane of the split 29 between the halves 26 and 28 of the housing 12. The intermediate shaft 48 has driven gear 60 secured thereto which engages the armature gear 38, and a driver gear 62 which drives a spindle gear 82 on the spindle 50. The driven gear 60 has a large center opening which is pressed onto the driver gear 62. An axial opening 68 (FIG. 7) is formed through the driver gear 62, and the shaft 48 is secured in the opening 68. The ends of the shaft 48 rotate in cylindrical sleeve bearings 72 (FIGS. 5 and 8) which are secured in semicylindrical recesses 74 formed in the bearing block 36 by bearing straps 76 and 77. The bearing strap 76 is inturn secured to the bearing block 36 by a screw fastener 78 and the strap 77 is secured to the block 36 by a hex head screw fastener 79 (FIG. 8). A thin disc shaped washer 80 (FIG. 5) is preferably installed between the driver gear 62 and the adjacent bearing 72. The driver gear 62 drives the spindle gear 82 on the spindle or output shaft 50.

The spindle shaft 50 has secured to the rearward end thereof the spindle gear 82 and has a reduced diameter threaded portion 84 (FIG. 5) at the forward end for receiving the chuck 24. The spindle shaft 50 rotates in a sleeve bearing 86 which fits in a generally semicylindrical recess 88 (FIGS. 8 and 9). The portion of the bearing block adjacent the forward end of the recess 88 is turned radially inwardly as indicated at 90 (FIG. 5) for axially locating and retaining the bearing 86. The spindle bearing 86 must absorb the loads imposed on the spindle shaft 50, and it is retained in the recess 88 by a bearing strap 92 (FIGS. 4, 8 and 9). The bearing strap 92 is formed from a spring steel strip and has a semicircular portion 94 which overlies the bearing 86, a flat portion 96 (FIG. 9), and a tab portion 98. The flat portion 96 has holes therein for two screw fasteners 100 and 102 (FIGS. 5, 8 and 9). One fastener 100 screws into the bearing block 36 to retain one end of the bearing strap 92. The other fastener 102 screws into female threads 106 (FIG. 8) of the hex head screw 79, the flat portion 96 being seated on the outer end of the screw 79. In an alternate construction, a single screw of a length to thread into the bearing block 36, and a spacer disposed between the bearing straps 77 and the strap 92 could be used instead of screws 79 and 102.

The other end of the bearing strap 92 has the tab portion 98 which loops over the bearing 86 and normally loosely engages a lug 108 formed on the bearing block 36. The use of the tab 98 to retain one end of the strap 92 permits a more compact design since the need for a fastener has been eliminated. Further possible damage to the bearing 86, by overtightening screws 100 and 102 securing the bearing strap 92, is eliminated. The tab 98 may upon slight movement or deflection of the bearing 86, during conditions when large separation forces are present between the gear 62 and the gear 82, or when large radial loads are imposed at the end of the spindle 50, tightly engage the lug 108 to prevent further movement of the bearing 86. The cover half 28 has an extended boss 109 (FIG. 9) which at its end is fitted with a bushing 111 made of an elastic material such as rubber. The bushing 111 and boss 109 are compressed against the strap 92 and further locate the bearing 86.

The spindle shaft 50 has a reduced diameter portion 110 (FIGS. 5 and 8) at the end opposite the chuck 24, and the portion 110 normally rotates freely in an opening 112 formed in a boss 114 on the bearing block 36. The portion 110 and opening 112 are coaxial, and the portion 110 under normal conditions does not contact the margin of the opening 112, but when the shaft 50 is under high loads and separation forces of large magnitude are present between the gears 62 and 82, the shaft 50 moves slightly and the circumference of the portion 110 will contact the margin of the opening 112 and thus help to prevent the shaft 50 from moving excessively and the gears 62 and 82 from disengaging.

The boss 114 also absorbs the axial thrust imposed on the spindle shaft 50 during such operations as drilling. A nylon thrust washer 116 is positioned on the portion 110 of the shaft 50 between the boss 114 and the main portion of the spindle shaft. The thrust forces are thus transferred from the shaft 50 to the washer 116, to the boss 114, and hence to the bearing block 36 and the outer housing 12. A washer 118 (FIG. 5) is also fitted between the gear 82 and the bearing 86 and maintains them separated.

I claim:

1. A power tool comprising an outer housing made of an electrical insulating material and enclosing a motor including an armature shaft and motor bearings, and a power train unit driven by said motor, said power train unit including at least one other shaft driven by said armature shaft, bearings for said other shaft, and a one piece metal bearing block, said shafts being rotatably mounted in their associated bearings, all of said bearings for said other shaft being mounted on said one piece bearing block, and said one piece bearing block being mounted directly on and enclosed by said outer housing.

2. A power tool comprising a housing, a motor including an armature shaft supported by motor bearings, and a power train unit driven by said motor and including an intermediate shaft and a spindle shaft, bearings for rotatably supporting said spindle and intermediate shafts, and a one piece metal bearing block receiving all of said bearings for said intermediate and spindle shafts, said bearing block being mounted on and within said housing, said shafts having meshing gears, one of said shafts being in offset relation to the other shafts, whereby said shafts and said gears form a compact gear drive train for said power tool.

3. A power tool as in claim 1, wherein said housing includes a cover half and a support half, said motor and said one piece bearing block being mounted on said support half, said cover half being secured to said support half and enclosing said motor and said power train unit.

4. A power tool as in claim 1, wherein at least one of said motor bearings is mounted on said bearing block.

5. A power train unit for a portable tool having a motor and an outer housing formed of an insulating material, said power train unit being adapted to be driven by said motor, and comprising at least two shafts, associated bearings for said shafts, and a metal bearing block, said shafts being supported by said bearings and all of said bearings for all of said shafts being mounted on said bearing block, said bearing block being in one piece and adapted to be secured directly to and enclosed within said insulating outer housing.

6. A power train unit as in claim 5, wherein said one piece bearing block has a recess formed therein for a bearing of each of said shafts, said recesses receiving said bearings, said power train unit further comprising individual bearing straps for holding each of said bearings in its associated recess, all of said bearing straps being secured to said one piece bearing block.

7. A power train unit as in claim 5, and further comprising a shaft driven by said motor, said shafts having meshing gears, one of said shafts being mounted in offset relation to the other of said shafts on said bearing block, whereby said shafts and said gears form a compact gear drive train for said power tool.

8. A power train unit for a portable tool comprising at least one shaft, at least one bearing for said shaft, and a bearing block, said shaft being rotatably supported by said bearing, said bearing block having a recess formed therein, said recess receiving said bearing, and at least one bearing strap for holding said bearing in said recess, said one bearing strap having one end thereof secured to said bearing block, said one bearing strap including a tab at the other end thereof and said bearing block having a lug formed thereon adjacent said tab, said tab cooperating with said lug to loosely retain said other end of said bearing strap, movement of said bearing forcing said tab into tight engagement with said lug and thus preventing further movement of said bearing.

9. A power train unit for a portable tool having a motor and a housing, said power train unit comprising at least one shaft, at least one bearing for said shaft and a bearing block, said shaft being rotatably supported by said bearing and said bearing being mounted on said bearing block, said bearing block being adapted to be secured to and enclosed within said housing, said one shaft having a reduced diameter portion and said bearing block having a boss portion with an opening coaxial with said reduced diameter portion, said reduced diameter portion rotating in said opening and normally not contacting the margin of said opening, and said reduced diameter portion contacting said margin of said opening when said one shaft is subject to axial forces to prevent excessive radial movement of said reduced diameter portion.

10. A power train unit as in claim 9, and further comprising a thrust washer on said reduced diameter portion and between said one shaft and said boss, said one shaft abutting said thrust washer which inturn abuts said boss to transfer thrust from said one shaft to said boss.

11. A power train unit as in claim 9, and further comprising another bearing for said one shaft, a bearing strap having a tab portion, and a lug formed on said bearing block, said tab cooperating with said lug to loosely retain said another bearing on said bearing block.

12. A power tool comprising an outer housing, a motor having an armature shaft, and a power train unit driven by said motor, said power train unit including an intermediate shaft driven by said armature shaft and a spindle shaft driven by said intermediate shaft, a one piece bearing block, each of said shafts of said power train unit and at least one end of said armature shaft being mounted in said one piece bearing block, said outer housing including a support half and a cover half, said motor and bearing block being secured directly to said support half, said cover half being secured to said support half and enclosing both said motor and bearing block, said outer housing being made of an electrical insulating material, and said bearing block being made of a metal having good heat sink characteristics.

* * * * *